United States Patent
Graciarena et al.

(10) Patent No.: US 12,505,852 B2
(45) Date of Patent: Dec. 23, 2025

(54) ACOUSTIC SOUND EVENT DETECTION SYSTEM

(71) Applicant: SRI International, Menlo Park, CA (US)

(72) Inventors: Martin Graciarena, Belmont, CA (US); Aaron Dennis Lawson, Sutter Creek, CA (US); Md Hafizur Rahman, Santa Clara, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 18/727,279

(22) PCT Filed: Dec. 16, 2022

(86) PCT No.: PCT/US2022/081786
§ 371 (c)(1),
(2) Date: Jul. 8, 2024

(87) PCT Pub. No.: WO2023/140992
PCT Pub. Date: Jul. 27, 2023

(65) Prior Publication Data
US 2025/0046333 A1  Feb. 6, 2025

Related U.S. Application Data

(60) Provisional application No. 63/301,439, filed on Jan. 20, 2022.

(51) Int. Cl.
*G10L 25/51* (2013.01)
*G10L 25/30* (2013.01)

(52) U.S. Cl.
CPC .............. *G10L 25/51* (2013.01); *G10L 25/30* (2013.01)

(58) Field of Classification Search
None
See application file for complete search history.

(56) References Cited

U.S. PATENT DOCUMENTS

| 10,037,313 | B2 | 7/2018 | Wang et al. |
| 10,884,503 | B2 | 1/2021 | Divakaran et al. |
| 11,238,844 | B1 * | 2/2022 | Ramanarayanan ... G10L 15/005 |
| 11,587,556 | B2 | 2/2023 | Mitchell et al. |
| 2014/0039890 | A1 | 2/2014 | Mundt et al. |

(Continued)

FOREIGN PATENT DOCUMENTS

| CN | 112634944 | A | 4/2021 |
| CN | 112750457 | A * | 5/2021 |

(Continued)

OTHER PUBLICATIONS

Singh, "Probabilistic Linear Discriminant Analysis (PLDA) Explained". pp. 1-24. Nov. 1, 2020. (Year: 2020).*

(Continued)

*Primary Examiner* — Qin Zhu
(74) *Attorney, Agent, or Firm* — Shumaker & Sieffert, P.A.

(57) ABSTRACT

In general, the disclosure describes a computing system to automatically identify and classify audio input, including non-speech audio signals. The computing system may also add new classes based on only a limited number of examples of the new classes, to identify classes of sounds for which the system had not been trained.

18 Claims, 5 Drawing Sheets

(56) References Cited

U.S. PATENT DOCUMENTS

| | | | |
|---|---|---|---|
| 2016/0302003 A1 | 10/2016 | Rahman et al. | |
| 2016/0307582 A1* | 10/2016 | Vempada | G10L 25/51 |
| 2017/0160813 A1 | 6/2017 | Divakaran et al. | |
| 2019/0096424 A1 | 3/2019 | Khoury et al. | |
| 2019/0109804 A1 | 4/2019 | Fu et al. | |
| 2019/0180735 A1 | 6/2019 | Mcelhaney | |
| 2020/0050788 A1* | 2/2020 | Feuz | H04L 51/02 |
| 2021/0081056 A1 | 3/2021 | Divakaran et al. | |
| 2021/0104230 A1* | 4/2021 | Mitchell | G06F 18/2431 |
| 2021/0217411 A1* | 7/2021 | Moreno | G10L 15/22 |
| 2021/0280171 A1* | 9/2021 | Phatak | G06N 20/00 |
| 2022/0059121 A1* | 2/2022 | Rao | G06N 20/20 |
| 2022/0087230 A1* | 3/2022 | Zhang | A01K 47/06 |

FOREIGN PATENT DOCUMENTS

| | | | | |
|---|---|---|---|---|
| EP | 4009321 B1 * | 5/2024 | | G10L 15/02 |
| JP | 2019505011 A * | 2/2019 | | G06F 3/017 |
| WO | 2017100334 A1 | 6/2017 | | |

OTHER PUBLICATIONS

International Preliminary Report on Patentability from International Application No. PCT/US2022/081786 dated Aug. 2, 2024, 10 pp.

International Search Report and Written Opinion of International Application No. PCT/US2022/081786 dated Mar. 30, 2023, 9 pp.

Schulz et al., "Extending deep learning to new classes without retraining", Detection and Sensing of Mines, Explosive Objects, and Obscured Targets, vol. 11418, Apr. 2020, pp. 13-26, Retrieved from the Internet on Feb. 24, 2023 from URL: https://www.researchgate.net/publications/34098711.

Notification of Reason for Refusal, and translation thereof, from counterpart Japanese Application No. 2024-541807 dated Mar. 4, 2025, 6 pp.

Notice of Intent to Grant, and translation thereof, from counterpart Japanese Application No. 2024-541807 dated Aug. 26, 2025, 3 pp.

* cited by examiner

ACOUSTIC SOUND EVENT DETECTION SYSTEM

This Application is a national stage application under 35 U.S.C. § 371 of PCT Application No. PCT/US2022/081786, filed 16 Dec. 2022, which claims the benefit of U.S. Provisional Patent Application 63/301,439, filed 20 Jan. 2022, the entire content of which are incorporated herein by reference.

GOVERNMENT INTEREST

This invention was made with Government support under Contract No. N4175620C3057 awarded by the irregular Warfare Technical Support Directorate (IWTSD). The Government has certain rights in this invention.

TECHNICAL FIELD

The disclosure relates to automatic classification and identification of audio information.

BACKGROUND

Audio data may include human vocalizations including speech. Audio data may also include non-speech sounds including human non-speech vocalizations, e.g., humming, crying, yodeling and similar vocalizations. Other examples of non-speech audio data may also include non-human vocalizations, e.g., from whales and other sea creatures, and a wide variety of other non-speech audio, such as the sounds from moving water, weather sounds, and other sounds from nature, as well as mechanically generated sounds.

SUMMARY

In general, the disclosure describes a computing system that may implement techniques to automatically identify and classify audio input, including non-speech audio signals. The computing system may also add new classes, based on a limited number of examples of the new classes, to identify classes of sounds for which the system has not been trained.

In one example, the disclosure describes a system comprising: a computation engine comprising processing circuitry for executing a machine learning system, wherein the machine learning system comprises: an embeddings extractor trained using an audio space comprising a plurality of non-speech sounds to generate an embedding of the input audio waveform; and a classifier configured to: determine, by comparing the embedding of the input audio waveform to a class of non-speech sounds with which the classifier has been trained, a score for the input audio waveform indicating whether the input audio waveform is the same or is different from the class of non-speech sounds; and output the score for the input audio waveform.

In another example, the disclosure describes a method comprising: generating, by an embeddings extractor of a machine learning system, the embeddings extractor trained using an audio space comprising a plurality of non-speech sounds, an embedding of the input audio waveform, wherein the embedding of the input audio waveform includes data for distinguishing a particular non-speech sound from the plurality of non-speech sounds; determining, by a classifier of the machine learning system, by comparing the embedding of the input audio waveform to a class of non-speech sounds with which the classifier has been trained, a score for the input audio waveform indicating whether the input audio waveform is the same or is different from the class of non-speech sounds; and outputting, by the classifier, the score for the input audio waveform.

In another example, the disclosure describes a non-transitory computer-readable storage medium comprising instructions that, when executed, cause processing circuitry to: generate, by an embeddings extractor of a machine learning system, the embeddings extractor trained using an audio space comprising a plurality of non-speech sounds, an embedding of the input audio waveform, wherein the embedding of the input audio waveform includes data for distinguishing a particular non-speech sound from the plurality of non-speech sounds; determine, by a classifier of the machine learning system, by comparing the embedding of the input audio waveform to a class of non-speech sounds with which the classifier has been trained, a score for the input audio waveform indicating whether the input audio waveform is the same or is different from the class of non-speech sounds; and output, by the classifier, the score for the input audio waveform.

The details of one or more examples of the disclosure are set forth in the accompanying drawings and the description below. Other features, objects, and advantages of the disclosure will be apparent from the description and drawings, and from the claims.

DETAILED DESCRIPTION

In general, the disclosure describes a computing system that may implement techniques to automatically identify and classify audio input, including non-speech audio signals. In some examples, the computing system may add new classes, by providing only a limited number of examples, to identify classes of sounds for which the system had not been trained. The computing system may include at least two components. A first component, an embeddings extractor, may create representations of the world knowledge of a large non-speech audio space, where the representations are configured to distinguish non-speech phenomena from other non-speech phenomena. A second component, a classifier, may receive these embeddings comprising representations of the non-speech sounds and discriminate the non-speech sounds from each other. The classifier may be trained to focus on specific classes of non-speech sounds that the user wants to discriminate and identify, e.g., rather than all classes of non-speech sounds.

The classifier is further configured to receive input that adds new classes of non-speech sounds that the user may want to identify, without the need to retrain the world knowledge included in the embeddings extractor. In other words, the classifier may enroll new classes of sounds, and use the new classes to discriminate and identify other input sounds, using a limited number of examples for the new class, e.g., using only one example. The classifier may act on only a few examples due to the broad world knowledge provided by the embeddings generated by the embeddings extractor. Developers may enroll new classes that the computing system may then be able to act on and deploy these as updates to the computing system. Also, end users of the computing system may enroll new classes to the system.

The computing system may allow the user to detect various desired sound classes in audio recordings. The computing system may also process the extensive collection of data in the embeddings extractor to find only those recordings that contain acoustic events of interest, thus saving a significant amount of human time and effort.

When compared to detecting speech phenomenon, the speech domain is much more limited than the general non-speech audio domain. Speech has a limited frequency range, identifiable patterns and includes words, parts of words, intonation, and other features. However, the representations in automated speech recognition systems may not be appropriate for the wide range of non-speech sounds, such as gunshots, bird songs, sounds produced by weather and so on. In some examples, the classifier of this disclosure may still use speech-based representations to identify some non-speech sounds, as long as the classifier is aware of the non-speech events. However, the representations output by the embedding extractor of this disclosure may be more diverse and may be larger, e.g., have significantly greater number of dimensions, when compared to embeddings from an embedding extractor trained for human conversation speaker identification.

Figure 1A:
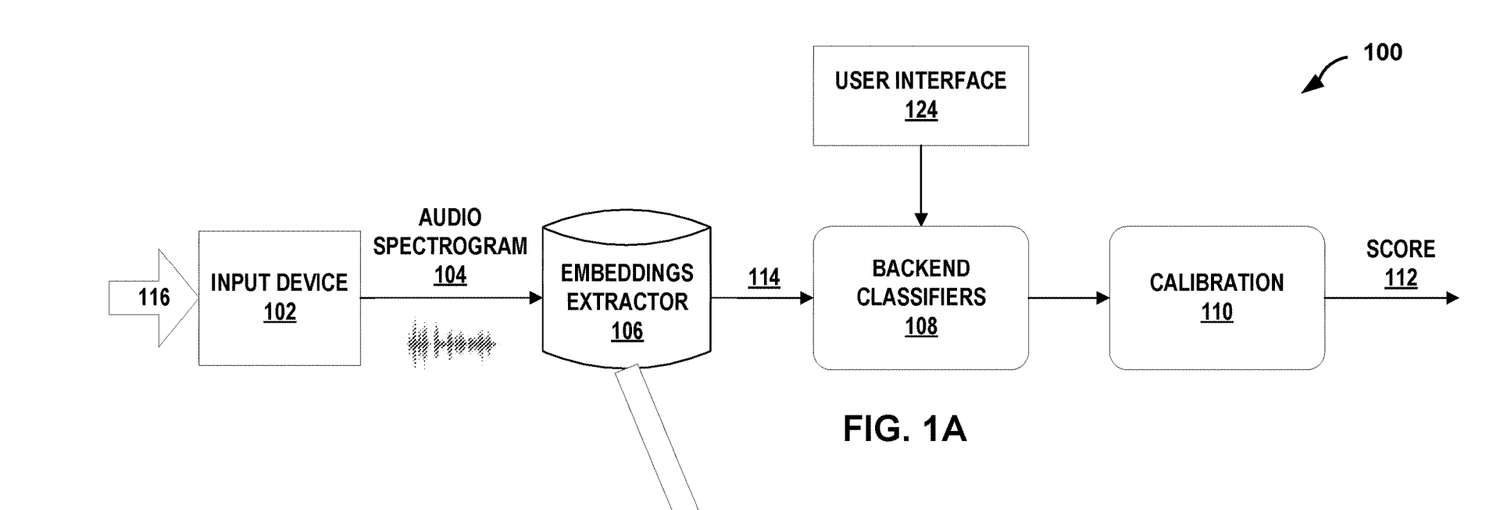
FIGS. 1A and 1B are block and conceptual diagrams illustrating one possible example arrangement of components for a sound event detection pipeline, according to one or more techniques of this disclosure.

FIG. 1A is a block diagram illustrating one possible example arrangement of components for a sound detection pipeline, according to one or more techniques of this disclosure. In the example of FIG. 1A, system 100 includes input device 102, embeddings extractor 106, backend classifiers 108, user interface 124 and a calibration module 110. The sound detection pipeline of system 100 may receive an input sound, e.g., input audio waveform 116, at input device 102, and output a score 112 for the input sound. Score 112 may indicate whether received input audio waveform 116 is the same or is different from a particular class of sounds. Score 112 may be a number, text, a flag, or other value that indicates the classification, e.g., the binary classification. One or more components of system 100 may be part of a machine learning system executed by processing circuitry of a computation engine. A computation engine may operate on a single computing device of computing system 200 or may operate distributed across several computing devices.

Input device 102 may be any device configured to receive a sound and convert the sound to an electronic representation of the sound. In the example of FIG. 1A, input device 102 may receive input audio waveform 116 and output audio spectrogram 104. In some examples, input device 102 may include one or more microphones, cameras, and similar devices as well as circuitry to directly capture an audio waveform and output audio spectrogram 104. In other examples, input device 102 may represent a peripheral device such as a storage or memory device, interface device such as a USB port or network interface, or other device configured to receive a representation of audio waveform 116 and output audio spectrogram 104. In some examples, the recording may include audio, video, data, and other information in analog or digital format stored to memory, streamed to input device 102 over a network, or otherwise obtained by system 100 via input device 102. In some cases, input audio waveform 116 and audio spectrogram 104 are substantially similar or identical.

Embeddings extractor 106 may receive input audio waveform 116, e.g., converted to audio spectrogram 104 in some examples, and output an embedding 114 of input audio waveform 116. Embeddings extractor 106 may be trained using an audio space comprising a plurality of sounds, which in some examples includes non-speech sounds. Non-speech sounds may include a sounds generated in nature, e.g., an avalanche, bird songs, waves on a shore, along with mechanically generated sounds such as motors, clocks, bells, explosions, and similar sounds.

System 100 of this disclosure, and more specifically embeddings extractor 106, may include deep neural network (DNN) models trained to generate embeddings and then utilized to build one or more other embeddings for a different set of data. Speaker embeddings are highly discriminant, small dimensional representations of audio samples from speakers. More generally, embeddings are highly discriminant, small dimensional representations of audio samples. Embedding extraction refers to the process of extracting a portion of something and may be described as a learned technique to represent discrete variables as continuous vectors. Embedding extractors are typically neural networks trained to discriminate within sounds classes, such as speakers, languages, phones, etc. For the system of this disclosure, embedding extraction may include mapping sounds, such as from audio spectrograms 104, to vectors on which processing circuitry of this disclosure may perform analysis and relational mapping. Embedding extraction may include the process of converting high-dimensional data to low-dimensional data in the form of a vector in such a way that two separate sounds may be categorized as similar, or different, from each other. Embedding 114 of input audio waveform 116 may be a vector in some examples. In some examples, embedding 114 of input audio waveform 116 may include data for distinguishing a particular non-speech sound from other non-speech sounds in the audio space of sounds.

Backend classifiers 108 may receive embedding 114 of input audio waveform 116. As noted above, embedding 114 may be generated based on the world knowledge of the audio space trained into embeddings extractor 106. Backend classifiers 108 are configured to discriminate among multiple sound classes. In some examples, backend classifiers 108 may be implemented using probabilistic linear discriminant analysis (PLDA). Processing circuitry executing backend classifiers 108 may map the high dimensional features within embedding 114 into lower dimensional space using linear discriminant analysis (LDA) to perform classification using PLDA. In some examples the PLDA implementation may be trained to determine only two different classes, e.g., a binary choice. The two classes may be "same" or "different." In this manner, backend classifiers 108 may receive embedding 114 for input audio waveform 114 and determine whether input audio waveform 114 may be classified as either the "same" or as "different" from one or more representations for which backend classifiers 108 has been trained.

An example to illustrate the operation of system 100, system 100 may receive a new input audio waveform 116, e.g., via input device 102. Backend classifiers 108 may be trained based on representations of cat sounds, or even more specifically, cat sounds under specific conditions, such as cats fighting, contented (purring), hungry, or other specific cat sounds. By processing embedding 114 generated from embeddings extractor 106, backend classifiers 108 may calculate a likelihood that the received new audio waveform 116, processed using the pipeline of system 100, is of same or different class than those cat sounds (or other class in different use cases), in general, that system 100 was trained on. In some examples, backend classifiers 108 may further calculate a likelihood that the received audio is the same or different from cat sounds under specific conditions described above, e.g., purring. In some examples, backend classifiers 108 may be trained using only a few examples of the cat sounds, which may be as few as just one example.

Figure 1B:
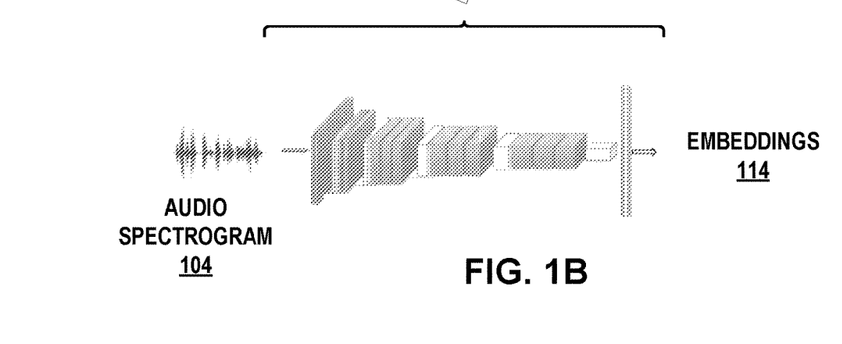

Other applications where system 100 of FIG. 1 may be useful may include a bird watcher walking in the forest and hears a new bird song, not heard before by the bird watcher. The bird watcher may like to know the bird species that produced the song. This could be accomplished by recording that sound and creating a detector, e.g., training backend classifiers 108 with a new class for that sound. In some examples, this detector can be used later to match the novel new bird song to a catalog of bird songs labeled by bird species. Additionally, the bird watcher may upload the new bird song detector software into an audio recording device left in the forest to detect future occurrences of that bird song and record day, time, temperature, and other parameters for future studies.

Another application example is where a machine repair technician is analyzing a possibly faulty motor. The motor, while operating, may be producing some strange sounds, for example, at random intervals. The technician may want to detect future occurrences of these sounds and match the occurrences of the sound to other measurable parameters (workload, temperature, revolutions per minute, etc.) in other instances to determine if these random sounds may be an indication of a possible catastrophic failure. Preventing that failure may prevent expensive down time and a possible expensive repair.

Thus, determining whether certain sounds contain significant information about some event may be desirable for real-world applications. Therefore, it may be useful to have a system, such as system 100, that may that can record and create, on the fly and with a short sample duration, a detector of other past or future occurrences of that same sound. In contrast to system 100 of this disclosure, some other examples of audio detection that may only provide detection of a limited number of acoustic sound classes. Also, these other examples do not allow users to enroll any new sound classes or update an existing sound class. The current system and methods described in this disclosure may include detection of some existing sound events such as gunfire, music, moving vehicles, background noises, animals, etc. In addition, the system of this disclosure may also include the capability to detect new sound classes by providing audio examples, as well as updating an existing sound class detector with new audio samples.

Calibration module 110 (illustrated as "calibration 110") of system 100 is configured to output scores used for the comparison of sounds. Calibration module 110 may include score calibration to produce interpretable scores. Some examples calibration module 110 may execute a logistic regression calibration module trained on sound detection scores.

Although illustrated and primarily described as an end-to-end system for sound detection, aspects of system 100 may be implemented as a plugin for inclusion within a speaker identification, sound detection, or other sound analysis system. For example, the plugin may include embeddings extractor 106, backend classifiers 108, and calibration module 110 to receive an audio spectrogram 104 from the sound analysis system and output score 112 for use by the sound analysis system.

Figure 2:
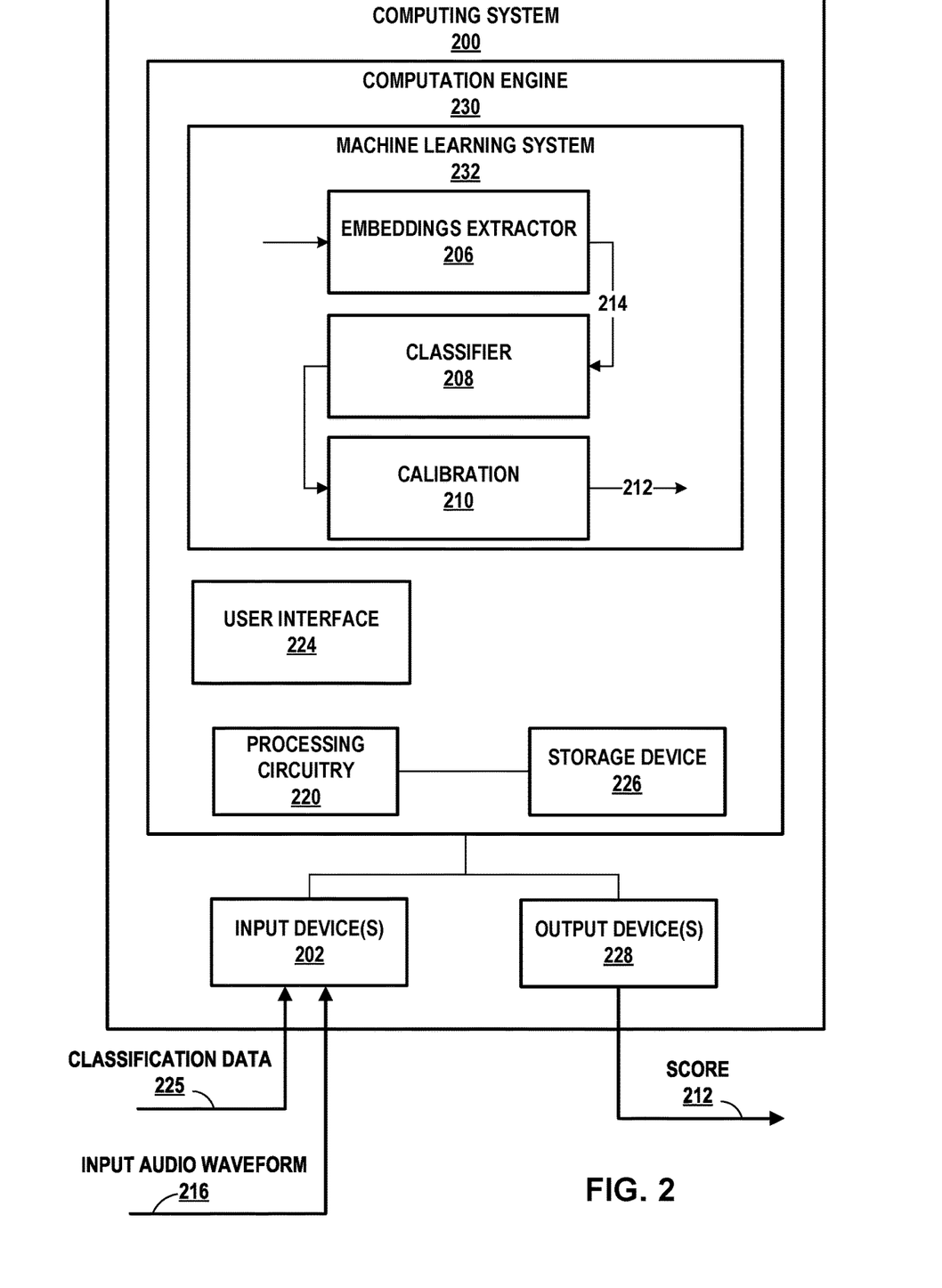
FIG. 2 is a block diagram illustrating is a block diagram illustrating a computing system configured to implement a sound discrimination system, according to one or more techniques of this disclosure.

FIG. 2 is a block diagram illustrating is a block diagram illustrating a computing system, according to one or more techniques of this disclosure. In the example of FIG. 2, computation engine 230 executes machine learning system 232 on computing system 200.

Computation engine 230 includes processing circuitry 220 for executing machine learning system 232. Processing circuitry 220 may also be operatively connected to storage device 226. Processing circuitry 220 may include one or more processors in some examples. Examples of processing circuitry 220 may include any one or more of a microcontroller (MCU), e.g. a computer on a single integrated circuit containing a processor core, memory, and programmable input/output peripherals, a microprocessor, e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein. Processing circuitry 220 may be distributed among one or more computing devices interconnected by a computer network to execute components of computing system 200, e.g., embeddings extractor 206, classifier 208, calibration 210, and user interface 224.

Examples of storage device 226 may include a memory device or any type of computer-readable storage media. Storage device 226 may include one or more of random access memory (RAM), read only memory (ROM), programmable read only memory (PROM), erasable programmable read only memory (EPROM), one-time programable (OTP) memory, electronically erasable programmable read only memory (EEPROM), flash memory, or another type of volatile or non-volatile memory device. In some examples the computer readable storage media may store instructions that cause the processing circuitry to execute the functions described herein. In some examples, the computer readable storage media may store data, such as configuration information, temporary values and other types of data used to perform the functions of this disclosure.

Machine learning system 232 includes embeddings extractor 206, classifier 208 and calibration module 210. Embeddings extractor 206, classifier 208 and calibration module 210 may represent example instances of embeddings extractor 106, backend classifier 108 and calibration module 110 described above in relation to FIG. 1 and have the same or similar characteristics and functions. For example, embeddings extractor 206 may be trained using an audio space comprising world knowledge of sounds, including non-speech sounds. Embeddings extractor 206 may receive input audio waveform 216, via input devices 202, and output embedding 214 of input audio waveform 216 to classifier 208. In some examples, embeddings extractor 206 includes a deep neural network trained using the audio space to process input audio waveform 216, and to generate high-dimensional features in embedding 214 for input audio waveform 216.

Classifier 208 is configured to receive embedding 214 of input audio waveform 216 from embeddings extractor 206. Classifier 208 may compare embedding 214, which may be a vector representation of input audio waveform 216, to a class of non-speech sounds, in some examples. In response to the comparison, classifier 208 may determine a score 212 for input audio waveform 216 indicating whether input audio waveform 216 is the same or is different from the selected class of non-speech sounds, as described above in relation to FIG. 1. In some examples, calibration module 210 may include programming instructions, such as a logistic regression calibration module trained on sound detection scores. In some examples, determining score 212 may include performing one or more classification operations (a classification).

Computation engine 230 may output score 212, as well as other data or information, via one or more output devices 228. Output devices 228 may include any one or more of an audio device configured to output sounds, a display configured to present graphics, text and similar information to a user, and communication circuitry configured to send the output to another device, such as a handheld computing device, a remote display or audio device, and another computing device, e.g., in a network.

Machine learning 232 of this disclosure may provide advantages over other types of audio classification machine learning systems. For example, classifier may be further configured to receive classification data 225, e.g., via user interface 224, and an input audio waveform 216 that adds new classes of non-speech sounds that the user may want to identify, without the need to retrain the world knowledge included in embeddings extractor 206. Classifier 208 may enroll new classes of sounds and use the new classes to discriminate and identify other input sounds, using only a limited number of examples for the new class, which in some examples may be only one example.

In one example implementation of adding a new class, a user may first identify that the new input audio waveform 216 is a new class, e.g., via user interface 224. The new input audio waveform 216 is processed by the DNN of embeddings extractor 206 as described above, and in relation to FIG. 1. Computing system 200 may extract high dimensional features from the DNN and project it through LDA space to reduce dimension of the extracted embeddings. The pretrained PLDA classifier, e.g., classifier 208 may model and decompose those extracted embeddings into acoustic model subspace and channel subspace. The final model for the new class is the projected embeddings in the PLDA acoustic model subspace.

In some examples, embeddings extractor 206 may receive the new audio waveform via a microphone, or similar device, or the new audio waveform may be a recording, or data, such as an audio spectrogram, as described above for input device 102 in relation to FIG. 1. Classifier 208 may also receive a user input, which may include an indication that the second input audio waveform is an example of a new class of non-speech sounds. In some examples, the user input may also include a label for the new class of non-speech sounds.

Classifier 208 may be configured to compare embedding 214 of any subsequent input audio waveforms received via input devices 202 to the new class of non-speech sounds. Classifier 208 may then output score 212 for each of the subsequent waveforms to indicate whether the subsequent waveform is the same or different from the new class. As described above in relation to FIG. 1, in some examples calibration module 210 may provide score calibration to produce interpretable scores. As one example of interpretable scores, if the system produces a score of 0.8 for an event, then 80% of the time that event should happen.

An advantage of machine learning system 232 of this disclosure is that the new class may be added without the need to retrain the world knowledge of the audio space for embeddings extractor 206. In other words, embeddings extractor 206 is unchanged as a result of adding the new class of non-speech sounds. Because training embeddings extractor 206 may use significant computing resources over a significant amount of time (e.g., weeks or months), adding a new class and the ability to discriminate received sounds against the new class may be useful when compared to other examples of sound event detection pipelines. In some examples, a developer or administrator for machine learning system 232 may add the new class. In other examples, an end user of machine learning system 232 may add the new class, e.g., by adding the example audio waveform and the identification of the example via the user interface, as described above.

Figure 3:
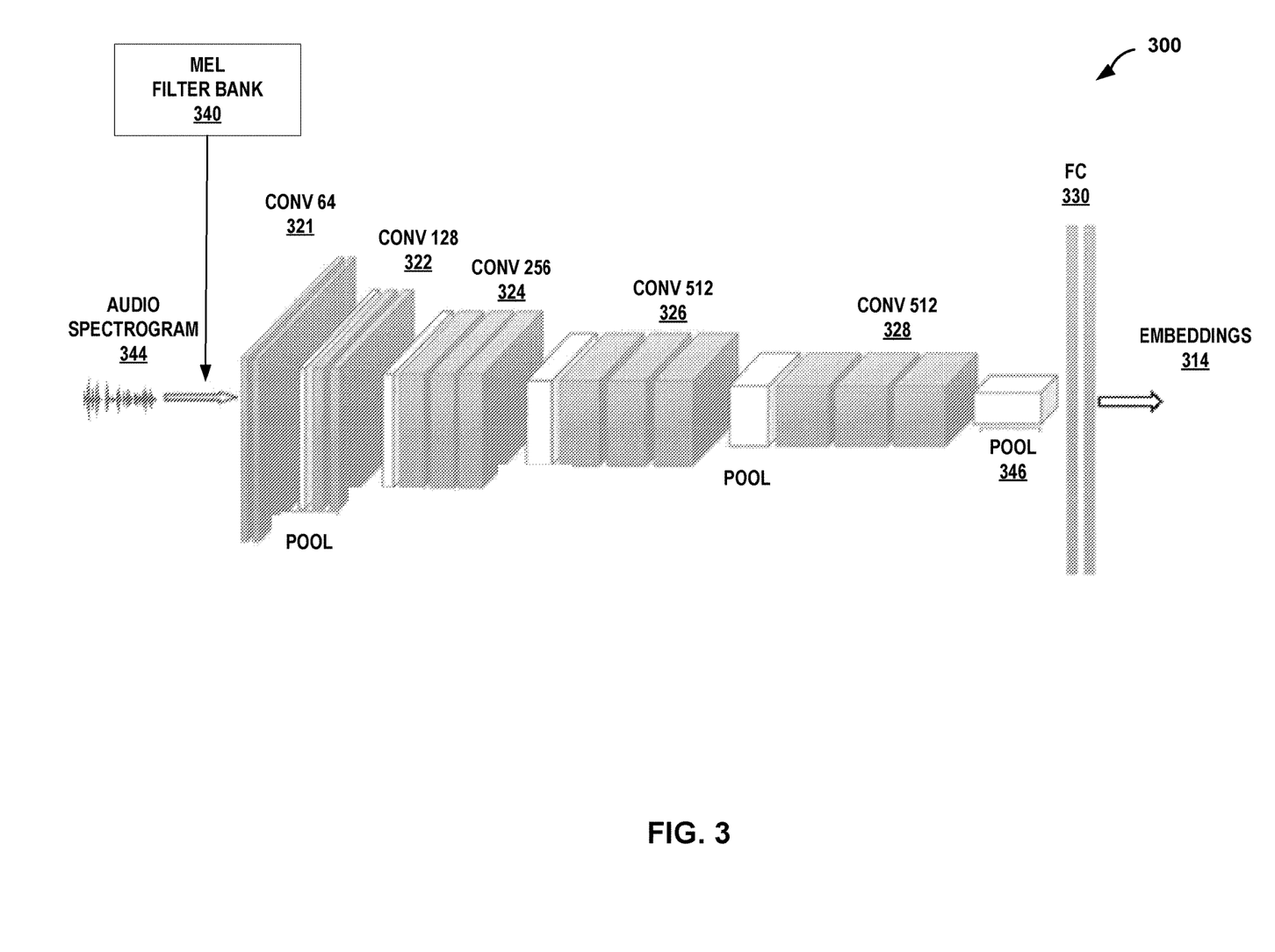
FIG. 3 is a conceptual diagram illustrating details of an example implementation of the embeddings extractor, according to one or more techniques of this disclosure.

FIG. 3 is a conceptual diagram illustrating an example neural network structure for computing embeddings, according to one or more techniques of this disclosure. Embeddings extractor 300 may represent an example instance of embeddings extractor 106 or 206. Input sound representations may include sound embeddings estimated from a pre-trained deep learning network trained on audio samples. Embeddings 314, in the example of FIG. 3, are 128-dimensional vectors. The input features may be 64 log Mel filter bank generated by a Mel filter bank 340. In some examples, the features may be computed using a one second window of audio spectrogram 344.

Neural network architecture components of embeddings extractor 300 may each include one or more NN layers executed by a machine learning system, e.g., machine learning system 232. The components in this example include convolutional (CONV) 64 layers block 321, CONV 128 block 322, CONV 256 block 324, CONV 512 block 326, CONV 512 block 328, and separate pool layer 346. CONV 128 block 322, CONV 256 block 324, CONV 512 block 326, and CONV 512 block 328 are associated with respective input pool layers. The numbers 64, 128, 256, and 512 refer to dimensionality of the input features.

In some examples, Mel filter bank 340 may process receiving input audio spectrogram 344 and pass the input signal through a pre-emphasis filter. The filtered signal may be sliced into (overlapping) frames, and a window function may be applied to each frame. Mel filter bank 340 may perform Fourier transform on each frame, such as a short-time Fourier transform (STFT or SFT), and calculate the power spectrum for each frame, and subsequently compute the filter banks. In some examples a final step in Mel filter bank 340 may include mean normalization.

In some examples, the pre-emphasis filter balances the frequency spectrum to correct for high frequencies that may have smaller magnitudes compared to lower frequencies. The pre-emphasis filter may also perform other functions such as to improve the signal-to-noise ratio (SNR) of input signal 344. In other examples, the pre-emphasis filter functions may be omitted in lieu of the mean normalization step.

Splitting the signal into short frames may preserve frequency contours of the input signal over time. Executing a Fourier transform over this short-time frame may provide an approximation of the frequency contours of the signal when concatenating adjacent frames. In some examples, Mel filter bank 340 may also apply a windowing function, such as a Hamming window, to the frames. In some examples, the frame size may be on the order of milliseconds (ms), e.g., 5-60 ms, while in other examples, the frame size may be approximately one second. The overlap may be approximately one half the frame size in some examples and may be larger or smaller overlap in other examples.

Computing the filter banks may include applying filters, such as triangular filters, to the power spectrum output from the Fourier transform to extract frequency bands. The Mel-scale approximately mimics the non-linear human ear perception of sound, by being more discriminative at lower frequencies and less discriminative at higher frequencies.

The network structure in the example of FIG. 3 also includes CONV 256 block 324, CONV 512 block 326 and CONV 512 block 328, with embeddings 314 output after processing by one or more fully connected (FC) layers 330. However, FIG. 3 describes just one example implementation of the embeddings extraction of this disclosure. In other examples, the embeddings extraction may include more, fewer, or different components in the arrangement. For example, output embeddings 314 from FC layers 330 may include 128-bit vectors in some examples.

After the first representation of input audio spectrograms 344 by the Mel filter banks 340, which adjusts the audio spectrum based on perceived human hearing, the DNN components of embeddings extractor 300 may determine which of the feature vectors is important for separating non-speech audio events. In other words, the DNN, e.g., at CONV 128 blocks 322, may create a feature that includes information useful for separating the non-speech audio events. As described above in relation to FIG. 1, embedding extractor 300 may be trained on a very large set of audio samples to develop world knowledge, e.g., knowledge of the non-speech audio space, to determine which features to store in the representation to be able to distinguish audio events from each other. These embeddings 314 provided to the backend classifier, e.g., backend classifier 108 of FIG. 1, allow backend classifier 108 to determine when audio information is different from other audio information.

Some examples of features/phenomena that may be included and used to distinguish sounds from one another may include frequency, frequency pattern over time, loudness, sharpness of the sound, e.g., a gunshot or a door slam compared to a siren or whale song, the length time for the sound, tonality, discreteness, structure, decay time, and similar features. The neural network may analyze the sound energy in each frame, e.g., a 10 ms frame, and a pooling layer at each step may combine the frames to determine changes over time, e.g., decay and patterns mentioned above over a longer interval, such as approximately one second.

The example of FIG. 3 includes one or more fully connected layers, FC layers 330. FC layers 330 may be implemented as feed forward neural networks that form the last few layers in the network. The input to FC layers 330 may include the output from the final pooling or convolutional layer 346, which is flattened and then fed to FC layer 330. In some examples, FC layers 330 may compile the data extracted by previous layers to form the final output, e.g., embeddings 314. Embeddings 314 may also be described as a non-linear transformation of the input, e.g., the world knowledge included in the different non-speech sounds of audio spectrograms 104 of FIG. 1, where the DNN of embeddings extractor 300 may be trained to discriminate classes of sounds. The output, embeddings 314, may include rich information that enable discrimination between different sounds in the space of non-speech audio. Embeddings 314 becomes the feature vector for the simpler backend classifier.

In this manner, the system of this disclosure is in contrast to some models, such as support vector machine (SVM) techniques for speech recognition, which may go directly from the Mel-frequency cepstral coefficients (MFCC) representation of received speech to classification of the speech. In speech recognition, the smaller volume of audio information, which may need fewer features for classification, may not use this world knowledge step, as used by the system of this disclosure. The model is trained to detect certain features and to classify specified phenomena. Instead, the system of this disclosure further winnows the world knowledge from the large, amorphous volume of non-speech audio into embeddings that may be used by the backend classifier. The embeddings extractor is not also the classifier for the system of this disclosure.

In an autoencoder, which receives an input, performs feature identification, may have an internal representation, input features, and the output predicts the input, e.g., how to best re-create the input. In contrast to an autoencoder, which does not use labels, because an autoencoder is trained without labels, the system of this disclosure may include labels for classes, which may produce a model that can determine whether one audio event is the same or different from another, within a predetermined error rate.

Embedding extractor 300 may be trained based on a large volume of acoustic events to predict the acoustic events. Once trained, embedding extractor 300 maps any acoustic event (part of the training data or unseen) into a high dimensional space. However, as described above in relation to FIGS. 1 and 2, adding new classes may require a significant effort. Also, if most of the trained classes are not relevant for a particular task, then retraining the complete model is time consuming and a waste of resources. But the internal representation of the audio data generalizes the model to discriminate patterns (sounds) that the model has not been trained on. Now, when embeddings extractor 300 provides embeddings 314 to the backend classifier of this disclosure, the backend classifier may identify new classes not trained into embeddings extractor 300, with a low error rate, even though the backend classifier may have only trained with a few examples. The backend classifier may compare the representation of the new sound to the representations of sounds, e.g., embeddings 314 from embeddings extractor 300. In this manner the system of this disclosure may distinguish new classes of sounds without the need to retrain embedding extractor 300.

In addition, because embeddings 314 may include a reduced dimensional vector, with the dimensions of the vector focused on distinguishing non-speech sounds from each other, the backend classifier of this disclosure may perform the comparison with reduced computing resources, when compared to performing a comparison on a larger multi-dimensional representation.

Figure 4:
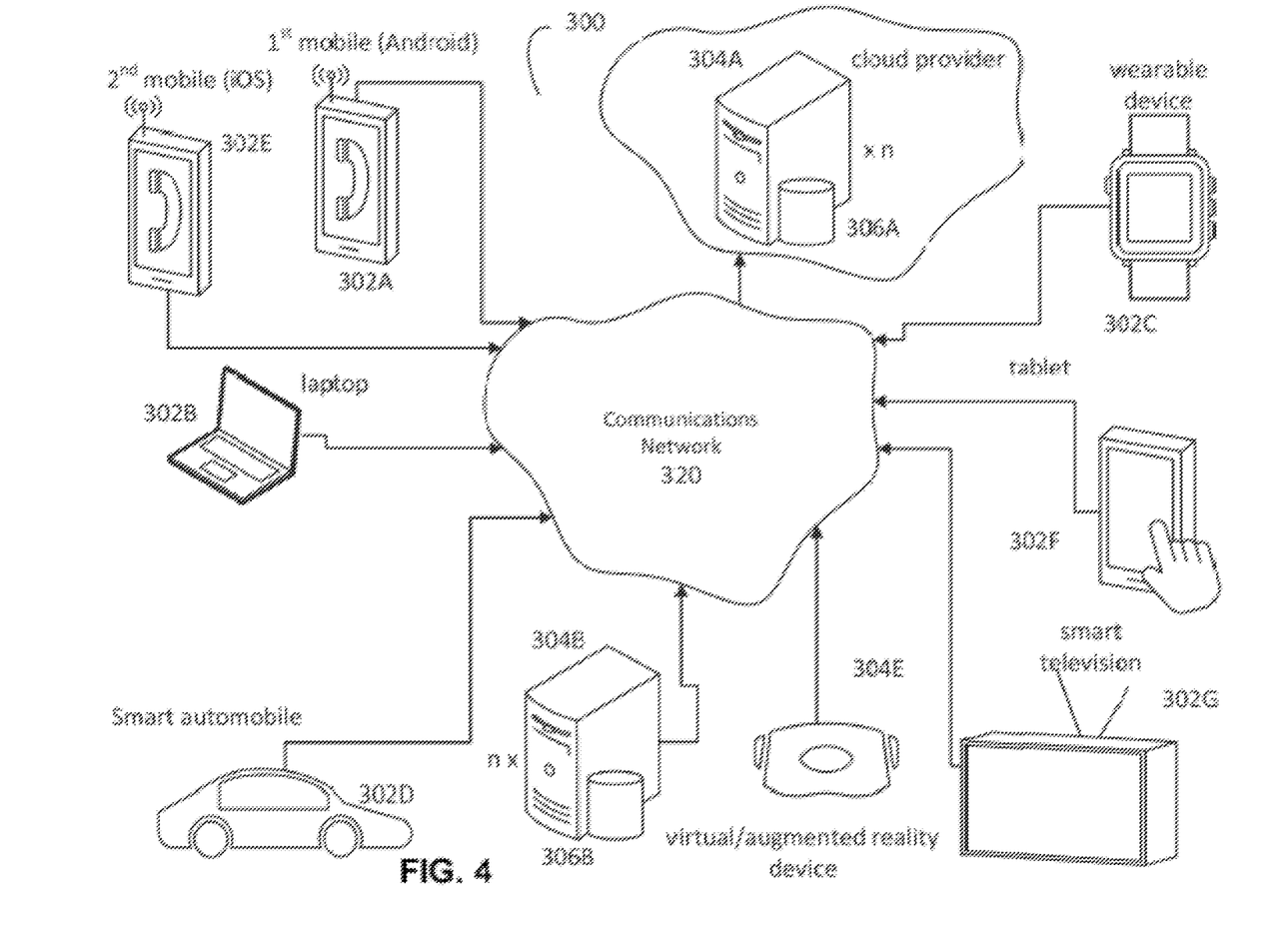
FIG. 4 is a block diagram of a number of electronic systems and devices communicating with each other in a network environment, according to one or more techniques of this disclosure.

FIG. 4 is a block diagram of a number of electronic systems and devices communicating with each other in a network environment according to one or more techniques of this disclosure. Components of an audio classification system, e.g., system 100 of FIG. 1, the embeddings extractor of FIG. 3, as well as the components of computing system 200 described in FIG. 2, may operate in a distributed network environment.

The network environment has a communications network 320 that connects server computing systems 304A through 304B, and at least one or more client computing systems 302A to 302G. As shown, there may be many server computing systems 304A through 304B and many client computing systems 302A to 302G connected to each other via the network 320. Examples of network 320 might be or include one or more of: an optical network, a cellular network, the Internet, a Local Area Network (LAN), Wide Area Network (WAN), satellite link, fiber network, cable network, or a combination of these and/or others. Each server computing system 304A-304B can have circuitry and software to communication with the other server computing systems 304A through 304B and the client computing systems 302A to 302G across network 320. Each server computing systems 304A to 304B can be associated with one or more databases 306A to 306B and may be configured to store information such as storage device 226 of FIG. 2. Each server 304A to 304B may have one or more instances of a virtual server running on that physical server and multiple virtual instances may be implemented by the design. A firewall may be established between a client computing system, for example, 302D and the network 320 to protect data integrity on the client computing system 302D. Processing circuitry on any one or more of servers 304A-304B may execute components of computation engine 230 to perform the functions described above in relation to FIGS. 1-3.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user's cloud-based site is given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device, 302A-302G, as well as a web-browser application resident on the client device, 302A-302G. In some situations, the cloud-based remote access for a wearable electronic device 302C, can be accessed via a mobile device, a desktop, a tablet device, cooperating with that wearable electronic device 302C. The cloud-based remote access between a client device 302A 302G and the cloud-based provider site 304A is coded to engage in one or more of the following 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud based remote access to a wearable electronic device, and 5) combinations of these.

In an embodiment, the server computing system 304A may include a server engine, a web page management component or online service or online app component, a content management component, and a database management component. The server engine performs basic processing and operating system level tasks. The web page management component, online service, or online app component may handle creation and display, or routing of web pages or screens associated with receiving and providing digital content and digital advertisements. Users may access the server-computing system by means of a URL associated therewith. The content management component handles most of the functions in the embodiments described herein. The database management component includes storage and retrieval tasks with respect to the database, queries to the database, and storage of data.

Figure 5:
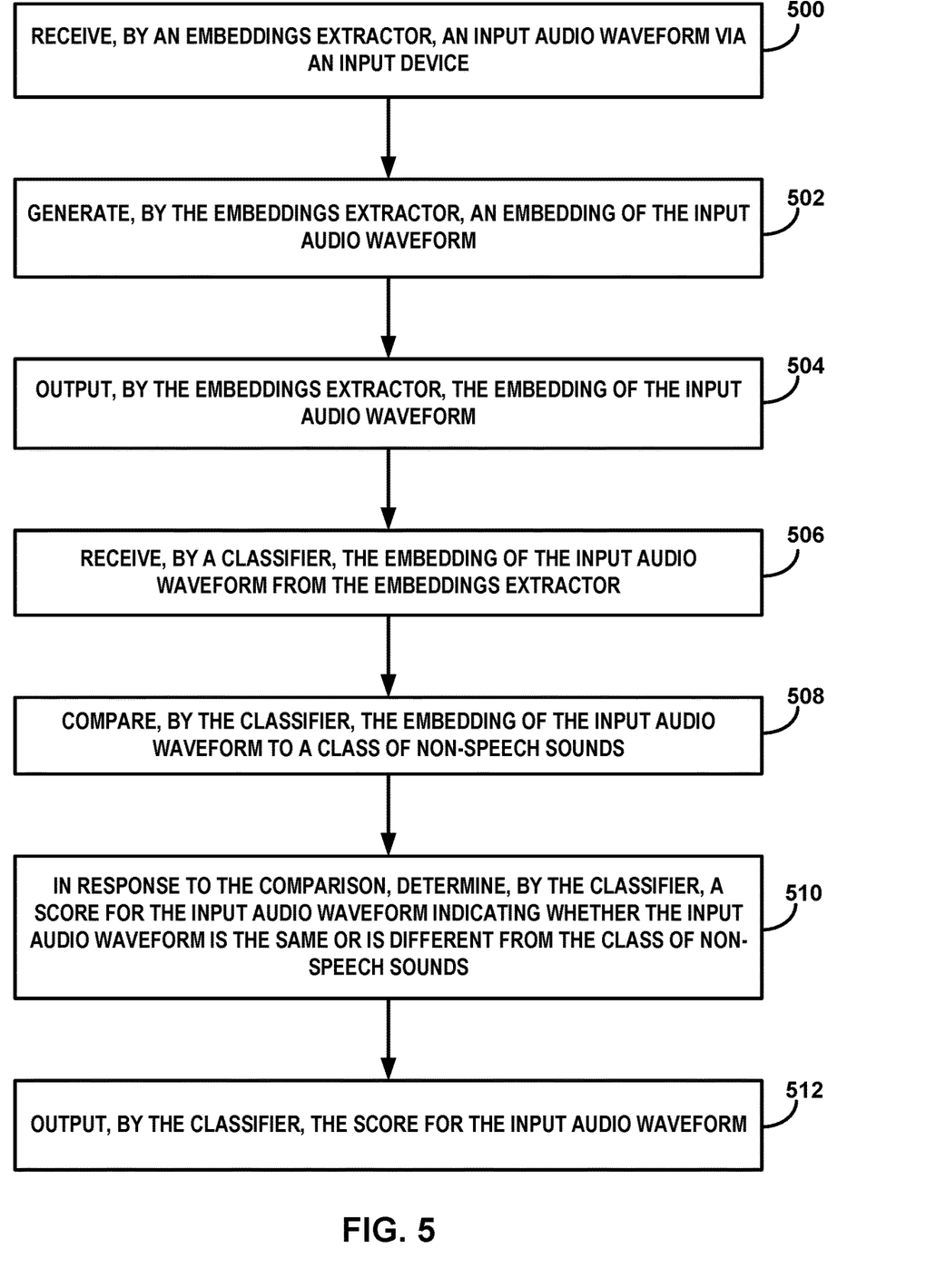
FIG. 5 is a flow chart illustrating an example of operation of the acoustic sound event detection system of this disclosure.

FIG. 5 is a flow chart illustrating an example of operation of the acoustic sound event detection system of this disclosure. As described above in relation to FIGS. 1-3, the embeddings extractor of this disclosure, e.g., embeddings extractor 106 of FIG. 1 may receive input audio waveform 116 via an input device 102 (500), which may be a recording, a data file or directly input via a microphone. The embeddings extractor, which is trained using a large audio space that may include sounds including, speech and non-speech sounds, may generate an embedding 114 (or 314) of input audio waveform 116, as shown in FIGS. 1 and 3 (502).

The embeddings extractor may output the representation of the input audio waveform to a classifier, e.g., backend classifiers 108 (504). Embedding 114 of the input audio waveform may include data, e.g., in the form of a vector, for distinguishing a particular non-speech sound from other non-speech sounds.

The classifier may receive the embedding, e.g., the representation, of the input audio waveform from the embeddings extractor (506) and compare the embedding of the input audio waveform to a class of non-speech sounds (508). In response to the comparison, the classifier, may determine a score for the input audio waveform (510). The score, e.g., score 112 and 212 of FIGS. 1 and 2 respectively, may indicate whether the input audio waveform is the same or is different from the class of non-speech sounds. The classifier may output the score for the input audio waveform, e.g., via a user interface, or other output device as described above in relation to FIG. 2 (512). In some examples, the machine learning system of this disclosure that executes the acoustic sound event detection system may also apply a calibration to the score for the audio waveform.

In one or more examples, the functions described above may be implemented in hardware, software, firmware, or any combination thereof. For example, the various components of FIGS. 1-4, such as embeddings extractor 106, machine learning system 232, filter banks 340 and convolution blocks of FIG. 3 may be implemented in hardware, software, firmware, or any combination thereof. If implemented in software, the functions may be stored on or transmitted over, as one or more instructions or code, a computer-readable storage medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The techniques described in this disclosure may be implemented, at least in part, in hardware, or combinations of hardware with software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry," such as with respect to processing circuitry 220, may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A system comprising:
   a computation engine comprising processing circuitry for executing a machine learning system, wherein the machine learning system comprises:
   an embeddings extractor trained, using a non-speech audio space comprising a plurality of non-speech sounds each representing a corresponding class of a plurality of non-speech sound classes, to generate an embedding for an input audio waveform, the embedding representing high-dimensional features for the input audio waveform, wherein a dimension of the high-dimensional features includes data for distinguishing a particular class of the plurality of non-speech sound classes from the input audio waveform; and
   a classifier configured to:
   map the high-dimensional features into a lower dimensional space to generate a reduced-dimensional embedding;
   determine, by comparing the reduced-dimensional embedding to the particular class, a score for the input audio waveform indicating whether the input audio waveform is the same or is different from the particular class;
   output the score for the input audio waveform; and
   enroll, based at least on one example of a new class of non-speech sounds, the new class of non-speech sounds without retraining the embedding extractor.

2. The system of claim 1, wherein the embeddings extractor comprises a deep neural network (DNN) trained using the non-speech audio space to process the input audio waveform to generate the embedding for the input audio waveform.

3. The system of claim 1, wherein the machine learning system further comprises a calibration module executed by the computation engine, wherein the calibration module is a logistic regression calibration module trained on sound detection scores.

4. The system of claim 1,
   wherein to determine the score, the classifier is configured to determine a probability associated with whether the input audio waveform is the same or is different from the particular class using probabilistic linear discriminant analysis (PLDA).

5. The system of claim 1,
   wherein the input audio waveform is a first input audio waveform;
   wherein the machine learning system is configured to:
   receive a second input audio waveform; and
   receive a user input, the user input comprising:
   an indication that the second input audio waveform is an example of the new class of non-speech sounds; and
   a label for the new class of non-speech sounds;
   process the second input audio waveform by the embeddings extractor, wherein to process the second input audio waveform comprises to extract second extracted embeddings comprising high dimensional features from a deep neural network (DNN) and reducing dimensionality of the second extracted embeddings,
   wherein the classifier is a pretrained classifier configured to:
   decompose the second extracted embeddings into an acoustic model subspace and channel subspace, and
   wherein to enroll the new class of non-speech sounds, the classifier is configured to generate a final model for the new class of non-speech sounds comprising the high dimensional features of the second extracted embeddings in the acoustic model subspace without retraining the embeddings extractor.

6. The system of claim 1,
   wherein the classifier is configured to compare an embedding of a subsequent input audio waveform to the new class of non-speech sounds, and
   wherein the embeddings extractor is unchanged as a result of adding the new class of non-speech sounds.

7. A method comprising:
generating, by an embeddings extractor of a machine learning system, the embeddings extractor trained using a non-speech audio space comprising a plurality of non-speech sounds each representing a corresponding class of a plurality of non-speech sound classes, an embedding for an input audio waveform, the embedding representing high-dimensional features for the input audio waveform, wherein a dimension of the high-dimensional features includes data for distinguishing a particular class of the plurality of non-speech sound classes from the input audio waveform;
mapping, by a classifier of the machine learning system, the high-dimensional features into a lower dimensional space to generate a reduced-dimensional embedding;
determining, by the classifier of the machine learning system comparing the reduced-dimensional embedding to the particular class, a score for the input audio waveform indicating whether the input audio waveform is the same or is different from the particular class;
outputting, by the classifier, the score for the input audio waveform; and
enrolling, by the classifier and based at least on one example of a new class of non-speech sounds, the new class of non-speech sounds without retraining the embedding extractor.

8. The method of claim 7, wherein the embeddings extractor comprises a deep neural network (DNN) trained using the non-speech audio space to process the input audio waveform to generate the embedding for the input audio waveform.

9. The method of claim 7, further comprising calibrating, by a calibration module of the machine learning system, the score output by the classifier, wherein the calibration module is a logistic regression calibration module trained on sound detection scores.

10. The method of claim 7, wherein determining the score comprises determining a probability associated with whether the input audio waveform is the same or is different from the particular class using probabilistic linear discriminant analysis (PLDA).

11. The method of claim 7, wherein the input audio waveform is a first input audio waveform, the method further comprising:
receiving, by the machine learning system, a second input audio waveform; and
receiving, by the machine learning system, a user input, the user input comprising:
an indication that the second input audio waveform is an example of the new class of non-speech sounds; and
a label for the new class of non-speech sounds
processing, by the machine learning system, the second input audio waveform, wherein processing the second input audio waveform comprises extracting second extracted embeddings comprising high dimensional features from a deep neural network (DNN) and reducing dimensionality of the second extracted embeddings;
decomposing, by the machine learning system, the second extracted embeddings into an acoustic model subspace and channel subspace, and
wherein enrolling the new class of non-speech sounds comprises generating, by the machine learning system, a final model for the new class of non-speech sounds comprising the high dimensional features of the second extracted embeddings in the acoustic model subspace without retraining the embeddings extractor.

12. The method of claim 10, further comprising:
comparing, by the classifier, an embedding of a subsequent input audio waveform to the new class of non-speech sounds,
wherein the embeddings extractor is unchanged as a result of adding the new class of non-speech sounds.

13. A non-transitory computer-readable storage medium comprising instructions that, when executed, cause processing circuitry to:
generate, by an embeddings extractor of a machine learning system, the embeddings extractor trained using a non-speech audio space comprising a plurality of non-speech sounds each representing a corresponding class of a plurality of non-speech sound classes, an embedding for an input audio waveform, the embedding representing high-dimensional features for the input audio waveform, wherein a dimension of the high-dimensional features includes data for distinguishing a particular class of the plurality of non-speech sound classes from the input audio waveform;
map, by a classifier of a machine learning system, the high-dimensional features into a lower dimensional space to generate a reduced-dimensional embedding;
determine, by the classifier of the machine learning system comparing the reduced-dimensional embedding to the particular class, a score for the input audio waveform indicating whether the input audio waveform is the same or is different from the class of non-speech sounds;
output, by the classifier, the score for the input audio waveform; and
enroll, by the classifier and based at least on one example of a new class of non-speech sounds, the new class of non-speech sounds without retraining the embedding extractor.

14. The non-transitory computer-readable storage medium of claim 13, wherein the embeddings extractor comprises a deep neural network (DNN) trained using the non-speech audio space to process the input audio waveform to generate the embedding for the input audio waveform.

15. The non-transitory computer-readable storage medium of claim 13, wherein the instructions further cause the processing circuitry to calibrate, by a calibration module of the machine learning system, the score output by the classifier, wherein the calibration module is a logistic regression calibration module trained on sound detection scores.

16. The non-transitory computer-readable storage medium of claim 13, wherein to determine the score, the instructions cause the processing circuitry to determine a probability associated with whether the input audio waveform is the same or is different from the particular class using probabilistic linear discriminant analysis (PLDA).

17. The non-transitory computer-readable storage medium of claim 13, wherein the input audio waveform is a first input audio waveform, and wherein the instructions further cause the processing circuitry to:
receive a second input audio waveform; and
receive a user input, the user input comprising:
an indication that the second input audio waveform is an example of the new class of non-speech sounds; and
a label for the new class of non-speech sounds;
process the second input audio waveform, wherein to process the second input audio waveform comprises to extract second extracted embeddings comprising high dimensional features from a deep neural network (DNN) and reducing dimensionality of the second extracted embeddings;

decompose the second extracted embeddings into an acoustic model subspace and channel subspace, and wherein to enroll the new class of non-speech sounds, the processing circuitry is configured to generate a final model for the new class of non-speech sounds comprising the high dimensional features of the second extracted embeddings in the acoustic model subspace without retraining the embeddings extractor.

18. The non-transitory computer-readable storage medium of claim 13, wherein the classifier is a pretrained PLDA classifier.

* * * * *